United States Patent [19]

Payne et al.

[11] 3,990,959
[45] Nov. 9, 1976

[54] PROCESS FOR ELECTRO-CHEMICAL MACHINING

[75] Inventors: Kenneth George Payne; Denis Edward Molloy; Charles Stanley Gardner, all of Derby, England

[73] Assignee: The Secretary of State for Defence in Her Britannic Majesty's Government of the United Kingdom of Great Britain and Northern Ireland, London, England

[22] Filed: Feb. 16, 1973

[21] Appl. No.: 333,372

Related U.S. Application Data

[63] Continuation-in-part of Ser. No. 136,446, April 22, 1971, abandoned.

[30] Foreign Application Priority Data

Apr. 25, 1970 United Kingdom............... 19993/70

[52] U.S. Cl.................... 204/129.55; 204/129.5; 204/129.6; 204/224 M
[51] Int. Cl.².................... B23P 1/00; B23P 1/12
[58] Field of Search....... 204/129.55, 129.6, 224 M, 204/129.5

[56] References Cited
UNITED STATES PATENTS

| | | | |
|---|---|---|---|
| 3,403,084 | 9/1968 | Andrews.................... | 204/129.55 X |
| 3,421,997 | 1/1969 | Williams........................... | 204/284 |
| 3,467,592 | 9/1969 | Eisberg et al. ................. | 204/224 M |

OTHER PUBLICATIONS
Electrochemical Machining by DeBaro et al., pub. by American Elsevier Pub. Co., N.Y., N.Y. pp. 201–203.

Primary Examiner—F.C. Edmundson
Attorney, Agent, or Firm—Cushman, Darby & Cushman

[57] ABSTRACT

Electro-chemical drilling of small diameter holes is achieved by placing an electrolyte discharge nozzle in fixed spaced apart relationship with a workpiece, heating the electrolyte passing between the discharge nozzle and the workpiece to increase the current conductivity of the electrolyte up to about 70° C and forcing a jet of electrolyte across the space onto the workpiece. The electrolyte pressure and discharge nozzle orifice length are matched so as to provide an unconfined jet of electrolyte which has a constant diameter so as to obviate the necessity of relative movement between nozzle and workpiece. Increased temperature results in a fine non-conductive mist at the end of the electrolytic jet thereby providing a process for drilling holes of smaller size in the workpiece than prior procedures.

A novel nozzle assembly is also disclosed adapted to produce holes in a workpiece by directing free streams of electrically charged electrolyte at the workpiece. The nozzle assembly has one end wall with several closely spaced orifices formed in the end wall, providing a method of forming more closely spaced holes than would be possible using separate nozzles, each with its own orifice.

2 Claims, 9 Drawing Figures

PROCESS FOR ELECTRO-CHEMICAL MACHINING

CROSS-REFERENCE TO RELATED APPLICATIONS

This is a continuation-in-part of our earlier application Ser. No. 136,446 filed Apr. 22, 1971, now abandoned.

BACKGROUND OF THE INVENTION

This invention relates to a method and apparatus for electro-chemically drilling small holes in electrically conductive workpieces.

The smallest holes that can be drilled by conventional electro-chemical machining are about 0.030 inches in diameter, a limitation resulting from the difficulties experienced in producing metal tubes or cathodes that are both adequately insulated and sufficiently stiff below a diameter of this magnitude.

Also known is an electrode assembly, as described, for example, in U.S. Pat. No. 3,467,592 to Andrews having a rod like cathode encased in glass, where the glass extends beyond the rod and is formed at the end of the extension into a nozzle that directed onto a metal workpiece a jet of electrolyte. The glass sheathed rod moves forwardly as machining progresses and the glass nozzle itself enters the hole, said to be as small as 0.005 inches diameter, as the hole deepens. The fragility of these glass nozzle cause great difficulty in their production and storage, and the overall diameter of the hole must be greater than the outside diameter of the tip of the rod.

The method and apparatus described by Andrews have a number of significant limitations. As mentioned above, the electrolyte issued from the electrode is guided by a thin-walled glass tube which must be traversed into the hole being machined in the workpiece. Quite apparently the diameter of the hole must be greater than the outside diameter of the glass tip, and owing to the fragility of the glass tip, practical limitations are placed on how small of a hole such procedures can produce. Another feature of prior processes including that of Andrews is that a flow of electrolyte is used, not a jet, thus when the conductivity of the electrolyte is increased the maching rate increases, but unfortunately the diameter of the hole increases, too. In operation, the flow of electrolyte strikes the bottom of the hole, reverses its direction, and flows as a substantially homogeneous mass up between the outside of the electrode or tube and the hole wall to the exterior. As it flows outwardly, it continues to conduct and consequently etches the hole wall to an undesirably larger size. For most applications, it is desirable to machine only a hole of minimum diameter, especially, for example, in cooling ducts of turbine blades.

It is an object of the present invention to describe a method of electro-chemically machining fine holes in a workpiece, the method obviating the necessity for such fragile apparatus or need of relative movement between the machine and workpiece.

Another object of the present invention is to provide means for drilling or electrochemically machining a plurality of holes in a workpiece using one piece of apparatus and drilling all of the holes simultaneously.

Another object of the present invention is to provide a process for increasing the current conductivity of the electrolyte by heating the electrolyte and thereby increasing the machining rate axially of the jet.

DETAILED DESCRIPTION OF THE INVENTION

Accordingly, the present invention, in its process aspect, comprises a method of electrochemically machining at least one hole in a workpiece including the steps of arranging an electrolyte discharge nozzle in a spaced apart relationship with the outer surface of a workpiece, causing a jet of electrolyte to be discharged onto the workpiece, heating the electrolyte in order to increase its current conductivity, passing an electric current through the workpiece and electrolyte in that order to a point of negative potential all the while maintaining the spacing between the electrolyte discharge nozzle and workpiece outer surface until the required hole depth has been reached, whereupon both current and electrolyte supply are terminated.

In a preferred embodiment of the process of the present invention the electrochemical machining is conducted using simultaneously a plurality of electrolyte jets while the electrolyte is heated from ambient temperatures, about 20° C, up to about 70° C or so and applying the electrolyte in a jet and with sufficient electrical potential such that when the heated electrolyte, after impinging on the workpiece, is dispersed at its impinging base into a fine mist free from electrolyte effect on the workpiece adjacent the area being machined, especially as the spray is forced outward of the hole thus machined. In this manner the overall diameter of the hole is smaller, up to 40% or greater, than those produced by prior procedures.

Other preferred embodiments and steps in the method aspect of the present invention include the following: Preferably the method includes making the electrolyte supply source the cathode or point of negative potential. Preferably the method includes ejecting the electrolyte with sufficient momentum onto the workpiece to substantially confine electrolytic dissolution to the base of the jet. The method further includes maintaining the cross-sectional profile of the jet of electrolyte substantially constant from exit from the discharge nozzle to impingement on the workpiece.

The present invention, in its apparatus aspect, includes apparatus for carrying out the method comprising an electrochemical machine having a conduit, one end of which in operation extends towards a workpiece, the one end being closed by a removable nozzle member having at least one orifice therein, the interior of the conduit being connectable to a pressurized electrolyte supply so as to permit, during operation, a flow of electrolyte into the conduit and out of the at least one orifice, the orifice axial length and electrolyte pressure being so matched and adjusted as to cause an unconfined jet of electrolyte to be ejected, the cross-sectional profile of the jet being substantially constant over a pre-selected distance from the orifice.

In a preferred embodiment the apparatus includes a nozzle assembly having a single, removeable end wall removeably attached to the conduit, the end wall provided with several openings therein preferably arranged in a spaced apart relationship according to a predetermined pattern. Conveniently the end wall pieces are easily removed and replaced, as needed, with end wall pieces of different configurations.

Other preferred embodiments and sub-assemblies of the apparatus aspect of the present invention include the following: Preferably the conduit is a rigid construction and means are provided whereby, in operation, electrolyte is filtered prior to entering the conduit center, for example, by a filter means comprising a lining member lining the inner wall of the conduit. The conduit is preferably, but not necessarily, electrically conductive. Preferably, the conduit is insulated by enclosing it within a fluid tight transparent non-conductive chamber or container which may be opened for the insertion and removal of said workpiece.

The invention will now be described with reference to the accompanying drawings in which.

Figure 1:
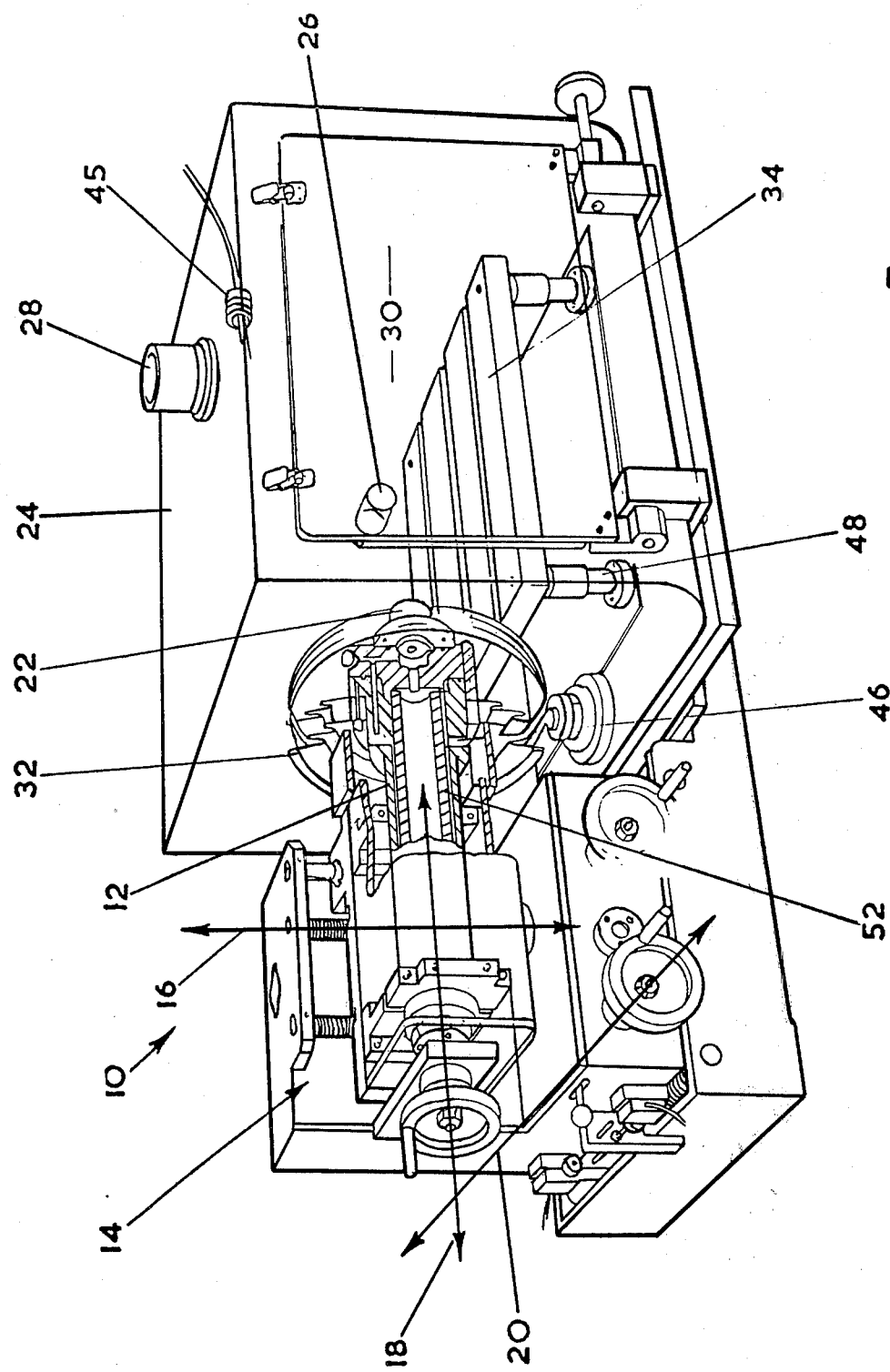
FIG. 1 is a perspective, partially broken-away view of an electrochemical machine in accordance with the invention.

In FIG. 1 an electrochemical machine 10 includes a conduit 12 mounted by one end on a compound slide apparatus 14, the compound slide apparatus being arranged to permit movement of the conduit 12 in the directions indicated by arrows 16, 18 and 20.

Figure 2:
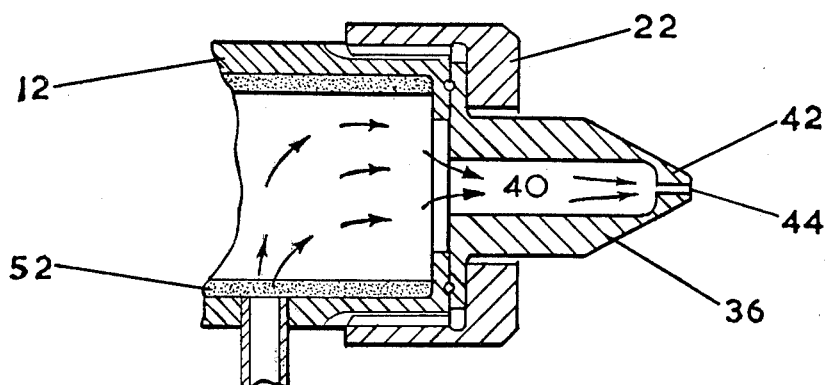
FIG. 2 is a cross-sectional view of one nozzle member in accordance with the invention.

Conduit 12 comprises a rigid tube the free end of which is screwed to receive a collar 22 as shown in FIG. 2. The collar is totally enclosed within a double walled perspex box 24 which is permanently vented at 26, has a fume extraction point 28 and has a double walled access door 30 for the purpose of inserting and removing a workpiece. Door 30 when shut is in fluid tight sealing relationship with box 24 and box 24 is in fluid tight sealing relationship with that part of the machine which supports conduit 12. Box 24 is immovable in operation, but movement of the compound slide apparatus and thus conduit 12 relative to box 24 is possible by virtue of the type of fluid tight seal member 32 utilized therebetween. This seal member 32 is known as a "gaiter" seal and is flexible in all directions.

A workpiece support table 34 is located in box 24 and is electrically insulated from parts externally of the box. In the present example, the table is made of stainless steel which has good resistance to erosion by spilled electrolyte.

The electrolyte solution is increased in conductivity by several independent factors which are used independently and include increasing the temperature of the electrolyte, and/or by increasing the acid content of the electrolyte.

The free end of conduit 12 is covered by a nozzle member 36. The nozzle member is placed against the free end of the conduit 12, trapping a rubber sealing ring 38 or the like therebetween. Collar 22 is then screwed onto the free end of the conduit and retains nozzle 36 in position.

One end 40 of nozzle 36 is open to the interior of conduit 12 while the other end 42 of the nozzle has a minute orifice 44 therein. The orifice may be as small as 0.001 inches in diameter.

Nozzle 36 is connectable via connection 46 to a pressurized supply of electrolyte 47 and electrolyte drain points 48 are provided in box 24.

In the apparatus, when in operation, a workpiece 50, which is in the present example is a turbine blade for a gas turbine engine, is fixed on table 34 inside box 24. A nozzle 36 having an orifice 44 of desired proportions is fixed to conduit 12 in the manner described herein and then positioned by manipulation of the compound slide apparatus 14, with respect to the point on the workpiece surface which is to be drilled.

The positioning of the nozzle with respect to the workpiece involves spacing the nozzle therefrom at a preselected, predetermined distance. This distance is less than the one over which it is known that a jet of electrolyte of constant given cross-section and perfect alignment can be maintained when the jet, having left the orifice, is no longer confined. No relative movement takes place between the nozzle and workpiece, the electrolyte itself merely bores deeper into the workpiece until the required depth is reached or the workpiece is drilled right through. Thus, the importance of maintaining a jet of constant cross-section will be realized.

An electrical circuit passing about 600 volts is provided and comprises a power source 43, the workpiece which acts as an anode and the electrolyte tank 47, which is made of stainless steel and acts as a cathode, and appropriate connections 45. The voltage may vary from at least 300 volts up to 1200 volts or higher, the amperage will also vary from 0 to 4 amps or greater; generally, at least a 2 amp current is applied. Box 24 is closed, electrolyte is pumped from tank 47 to nozzle 42 via connection 46 a ceramic filter 52 and conduit 12, whereupon it issues through orifice 44 in the form of a straight jet of constant cross-section. Depending on the orifice diameter, the jet diameter may be as little as 0.001 inches. The jet of electrolyte bridges the gap between nozzle and workpiece and impinges on the latter, which causes the jet to break up at its base, into a very fine mist which, although it might spread over an area which is large relative to the jet diameter, is so dispersed as to have no electrolytic effect on the material surrounding the workpiece surface portion which is deliberately being machined. Thus, is shown in greater detail in FIGS. 8a and 8b. on impingement of the jet of electrolyte on the workpiece, current is switched on and flows in a direction opposite to the direction of flow at the electrolyte, that is from the anode workpiece to the cathode nozzle, and electrolytic machining of the workpiece takes place in known manner. According to the present invention, a jet of electrolyte is used which comprises a central core of electrolyte which, when impinging upon the workpiece breaks up into a fine nonconducting mist. As the conductivity of the electrolyte is increased the resulting hole produced according to the present process is smaller than with prior procedures, as illustrated above. Although not wishing to be bound by any particular theories, it is believed that the reduced hole size advantage is that more current flows for a given voltage, increasing the machining rate axially of the jet.

The hole produced by the electrochemical drilling as described in the process of the invention is invariably larger than the diameter of the jet; however, the overall hole diameter is smaller than holes produced by similar procedures. For example, a jet 0.002 inches in diameter produces a hole the diameter of which for most of its length is approximately five times the jet diameter; a hole produced by a jet 0.003 inches in diameter is approximately four times greater in diameter than the jet, and a hole bored by a 0.010 diameter jet is approximately three times the diameter thereof. A hole drilled according to the present process tends to be convergent at its bottom, but this can be substantially removed by either an extra high voltage blip through the circuitry when full depth has been reached or, if the hole is to go right through, by the application of a wax sheet on the back face of the part to be machined, which sheet temporarily restricts the flow of electrolyte thus causing extra machining action locally.

Figures 3, 4:
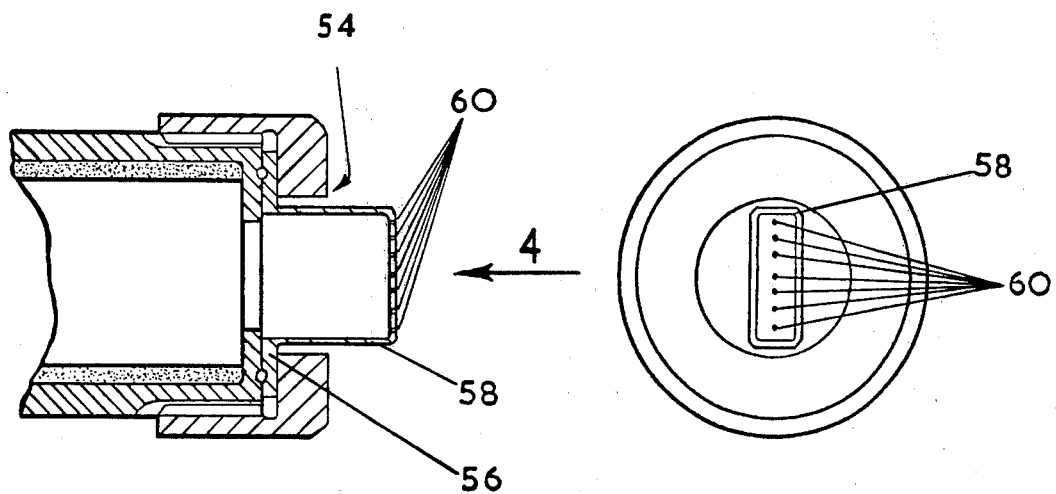
FIG. 3 is a cross-sectional view of a further nozzle member having a plurality of orifices therein.
FIG. 4 is a view on arrow 4 of FIG. 3.
Figure 5:
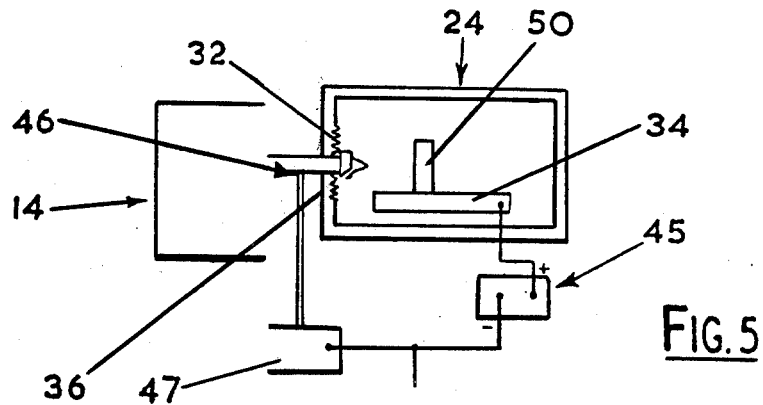
FIG. 5 is a diagrammatic arrangement of the apparatus in accordance with the invention.

According to a preferred embodiment of the invention, several holes are simultaneously drilled in the workpiece. For example, a number of holes can be simultaneously drilled by providing a nozzle as shown at 54 in FIGS. 3 and 4. The nozzle 54 has a circular flange portion 56 by which it is located against conduit 12 as described and a hollow wedge portion 58, the thinner end of which is flat, and has a row of holes 60 therein. These holes can be formed by raising dimples, polishing of the crowns and reaming out the resulting holes with an appropriately sized spade drill or the like. The holes can, of course, be arranged in any desired pattern.

As described herein, no part of the machine moves while machining is taking place but it is possible to produce slots in a workpiece by traversing the appropriate slide during machining. The length of the slot will be limited by the flexibility of the sealing gaiter 32 but other sealing means could be provided.

It has been found that by drilling with the apparatus described herein, a hole can be satisfactorily produced with its axis at an angle of less than 90° to the workpiece to the appropriate angle relative to the axis of orifice 44 prior to machining. Provided the jet velocity is high enough the jet impinges on the workpiece surface without spreading in a manner which would undesirably affect the required area of impingement. Electrolyte pressure, unconfined jet length and orifice length have a critical relationship with respect to each other and have to be closely controlled in order to maintain an unconfined jet of constant cross-section.

It will be seen from the foregoing description that the drilling of extremely fine holes is achieved by the use of extremely robust apparatus, the production, handling and storage of which presents no problems.

Figure 6:
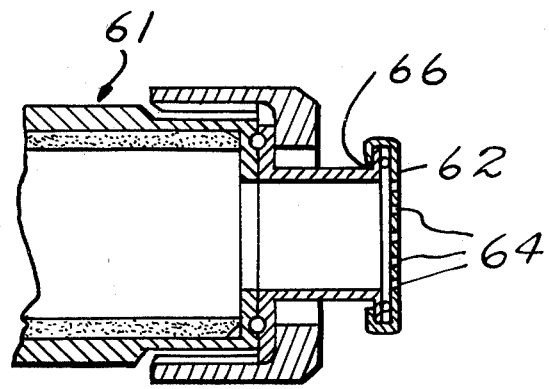
FIG. 6 is a cross-sectional view of a nozzle assembly having a removeable end wall with a plurality of orifices therein.
Figure 7:
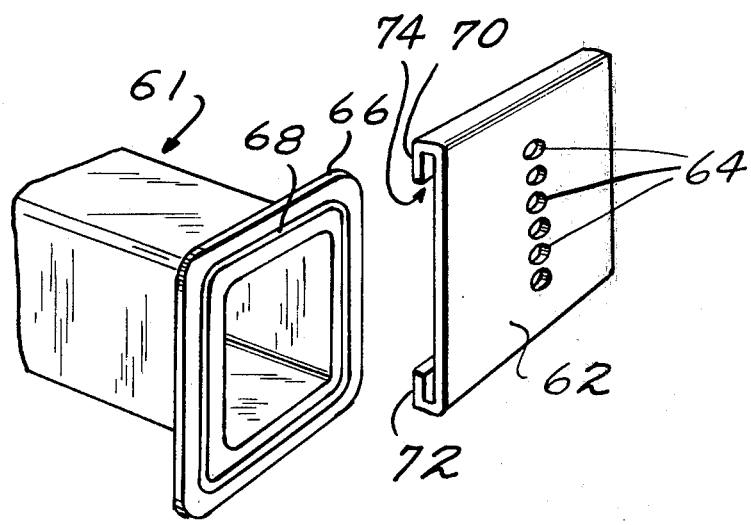
FIG. 7 is a perspective end view of the nozzle assembly of FIG. 6.

FIGS. 6 and 7 illustrate a nozzle 61 having a removeable end plate 62 in it, through which in operation, electrolyte is forced in the form of a plurality of jets, onto the workpiece.

Nozzle 61 has an outwardly turned flange 66 on its outlet end and a resilient sealing member 68 is fixedly half buried in a groove which extends around the flange front face. End plate 62 has two opposing ends 70–72 turned over and on assembly with nozzle 61, the turned over ends of the plate are placed behind the flange 66 and to one side thereof and the plate slid sideways across the face of the flange. The end plate is of sufficiently large area to completely overlap the sealing member 68 and the gap 74 is of a magnitude that ensures that a sealing fit is obtained between the seal member 68 and back face of end plate 62.

It will be appreciated that utilization of a nozzle as described with reference to FIGS. 6 and 7 will simplify the obtaining of hole patterns in a workpiece, by necessitating only the sliding off of one plate 62 from nozzle 61 and the sliding on of another plate having the desired orifice pattern.

Figure 8A:
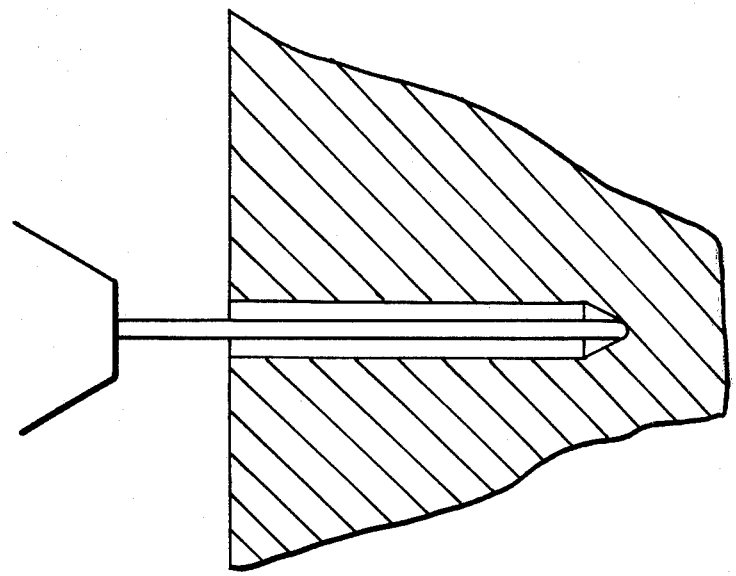
FIGS. 8a and 8b show, respectively, cross-sectional views illustrating the head of the electrolyte opening bore using prior procedures and the head of electrolyte at the opening with increased conductivity according to the present invention.
Figure 8B:
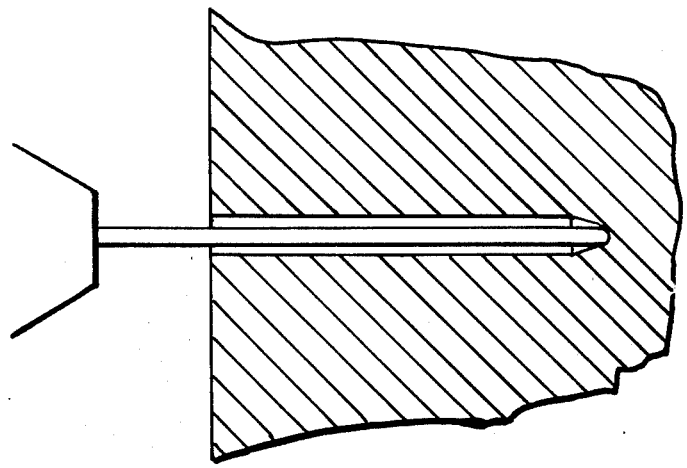

FIGS. 8a and 8b further illustrate a comparison of the process of the present invention with prior procedures. FIG. 8a shows a jet of electrolyte impinging upon the inside surface of a hole electrochemically machined in a workpiece. As shown, as the flow of electrolyte hits the bottom of the hole and reverses in direction, it flows in a rather homogeneous mass up between the outside of the electrode or jet, as the case may be, and the hole wall. However, the electrolyte still continues to conduct electricity, at least at the area adjacent the head of the electrolyte, and as it conducts it continues to etch into the workpiece and increases the hole to an undesirably larger size.

In FIG. 8b, according to the present invention, the pressure and voltage remain the same as in 8a but the conductivity is increased, as described below. A true jet impinges upon the workpiece; the jet comprises a central core of electrolyte which breaks up into a fine non-conductive mist almost immediately on contacting the workpiece. A hole of smaller overall diameter is thus produced. The reason for the reduced hole size when using a jet of increased conductivity is that more current flows for a given voltage, increasing the machining rate axially of the jet. The increased energy is given off as heat which boils away more electrolyte than prior procedures, thus reducing the size of the effective head of electrolyte forming at the working end of the jet and attacks the bore wall. Of particular advantage is the combination of using a jet, as described above, and heating the electrolyte which not only increases the electrolyte conductivity but also facilitates boil away of the electrolyte.

An important aspect of the present invention is increasing the conductivity of the electrolyte. A number of measures may be employed; however, we prefer to either heat the electrolyte, increase the concentration of the active portion of the electrolyte, or both. While theoretically an electrolyte temperature as low as 0° C may be used, in practice the lowest temperature that is used is ambient which is in the neighborhood of about 20° C or slightly higher during operation, but if the temperature of an electrolyte of given concentration, is raised from ambient temperature to 70° C, the conductivity will be approximately doubled.

The invention will be further illustrated by the following working Examples in which all parts and percentages are expressed by weight unless otherwise indicated.

EXAMPLE I

With a jet diameter of 0.010 and an initial length of 0.750, a hole of 0.35 diameter can be drilled by applying a potential difference of 650 volts along the length of the jet causing it to carry a current of 200 milliamps when 15% sulphuric acid electrolyte is used at a pressure of 20 psig.

EXAMPLE II

When a jet diameter of 0.003 and an initial length of 0.200, a hole of 0.015 diameter can be drilled by applying a potential difference of 500 volts along the length of the jet causing it to carry a current of 23 milliamps when 45% sulphuric acid electrolyte is used at a pressure of 50 psig.

EXAMPLE III

With a jet diameter of 0.054 and an initial length of 0.700, a hole of 0.150 diameter can be drilled by applying a potential difference of 450 volts along the length of the jet causing it to carry a current of 3 amps when 20% sulphuric acid electrolyte is used at a pressure of 8 psig.

EXAMPLE IV

With a row of 35 parallel jets of 0.003 diameter with a spacing of 0.035 and an initial length of 250, a row of holes 0.015 in diameter and 0.035 spacing can be drilled by applying potential difference of 650 volts along the lengths of the jets (the jets being connected in parallel electrically) causing them to carry a total current of 700 milliamps when 15% sulphuric acid electrolyte is used at a pressure of 30 psig.

What is claimed is:

1. In a process for electrochemical machining for producing at least one hole in a workpiece including the steps of:
   1. arranging at least one electrolyte discharge nozzle at a predetermined distance and in a spaced relationship with the surface of the workpiece to be machined;
   2. discharging the electrolyte from the electrolyte nozzle in a charged electrolyte stream toward and impinging upon the workpiece; and
   3. concurrently applying an electrical potential between the electrolyte jet and the workpiece of sufficient intensity to remove at least some material from the workpiece;

the improvement of increasing the conductivity of the electrolyte jet thereby increasing the electrochemical machining rate axially of the jet comprising:
   a. applying the electrolyte from a temperature between about ambient temperature up to about 70° C.;
   b. applying to the charged electrolyte stream an electrical potential of sufficient intensity such that the jet of electrolyte, after impinging on the workpiece, is dispersed at its impinging base into a fine mist devoid of electric effect on the workpiece adjacent the area being machined; and
   c. thereby reducing the size of the working head of the electrolyte jet impinging on the workpiece and resulting in an opening in the workpiece of reduced diameter the process being conducted devoid of relative movement between the electrolyte discharge nozzle and the workpiece.

2. Process according to claim 1 wherein the workpiece is traversed during machining while maintaining the distance between the discharge nozzle and the work piece surface constant thereby producing a slotted opening in the workpiece.

* * * * *